(12) United States Patent
Law et al.

(10) Patent No.: US 12,444,006 B2
(45) Date of Patent: Oct. 14, 2025

(54) PROPERTY RECOMMENDATION SYSTEM, METHODS, AND APPARATUS

(71) Applicant: Keller Williams Realty, Inc., Austin, TX (US)

(72) Inventors: Mark Nicholas Law, Leander, TX (US); John Keller, Austin, TX (US); Kaiser H.D. Kabir, Austin, TX (US); Timothy Howard Nats, Highlands Ranch, CO (US)

(73) Assignee: Keller Williams Realty, Inc., Austin, TX (US)

( * ) Notice: Subject to any disclaimer, the term of this patent is extended or adjusted under 35 U.S.C. 154(b) by 297 days.

(21) Appl. No.: 17/715,138

(22) Filed: Apr. 7, 2022

(65) Prior Publication Data

US 2022/0327643 A1 Oct. 13, 2022

Related U.S. Application Data

(60) Provisional application No. 63/172,429, filed on Apr. 8, 2021.

(51) Int. Cl.
G06Q 30/00 (2023.01)
G06Q 30/0601 (2023.01)
G06Q 50/16 (2012.01)

(52) U.S. Cl.
CPC ......... *G06Q 50/16* (2013.01); *G06Q 30/0631* (2013.01)

(58) Field of Classification Search
CPC .............................................. G06Q 30/06–08
See application file for complete search history.

(56) References Cited

U.S. PATENT DOCUMENTS

| | | | |
|---|---|---|---|
| 10,748,650 B1* | 8/2020 | Ricci | G16H 30/20 |
| 2012/0254045 A1* | 10/2012 | Orfano | G06Q 30/06 |
| | | | 705/306 |
| 2021/0056607 A1* | 2/2021 | Eathakota | G06Q 30/0627 |
| 2021/0142385 A1* | 5/2021 | Alahmady | G06Q 30/0631 |
| 2021/0224936 A1* | 7/2021 | Dejanovic | G06Q 30/0641 |
| 2021/0248700 A1* | 8/2021 | Kelton | G06Q 30/0201 |
| 2021/0374825 A1* | 12/2021 | Periyathambi | G06Q 30/0631 |

OTHER PUBLICATIONS

Kargaran, H., "'A Room with a View:' Building a Statistical Model that Encompasses All the Key Variables in Real Estate Appraisal", Golden Gate Univ., Dec. 2020, Proquest Dissertations and Theses 2021 (Year: 2021).*

* cited by examiner

*Primary Examiner* — Ethan D Civan
(74) *Attorney, Agent, or Firm* — Spencer Fane, LLP

(57) ABSTRACT

Methods, apparatus, and systems are disclosed that determine property recommendations for a user. The methods, apparatus, and systems may also predict when a user is likely to become a property buyer and/or seller to determine when certain property recommendations are to be made. The methods, apparatus, and systems use one or more machine learning algorithms to determine a dynamic preference profile for a user that accurately reflects the user and how the user changes over time. The preference profile takes into account property-related information and user characteristic information as variables for the machine learning algorithm(s).

18 Claims, 12 Drawing Sheets

PROPERTY RECOMMENDATION SYSTEM, METHODS, AND APPARATUS

PRIORITY CLAIM

This application claims priority to and the benefit as a non-provisional application of U.S. Provisional Patent Application No. 63/172,429, filed Apr. 8, 2021, the entire contents of which are hereby incorporated by reference and relied upon.

BACKGROUND

Many people today often take online real estate websites and mobile applications for granted. These digital products, services, and destinations typically show available homes for sale or rent within a specific geographic area, such as a zip code or town. Some real estate digital products even provide estimated prices for homes. Before these digital products, the only way to locate available real estate was through printed magazines/newspapers, real estate agents, or word of mouth.

Known real estate digital products are buyer-agnostic. For instance, these known real estate digital products are concerned with property valuations and the display of housing information. These known websites and mobile applications are often static in that the same real estate information is presented to all of the buyers. Of course, some digital products allow a buyer to filter real estate criteria, and even some digital products permit a buyer to filter their search criteria. However, such searches only narrow down the static information rather than specifically personalizing and/or tailoring the information to the buyer and dynamically updating the information based on learned characteristics of the buyer.

A need accordingly exists for determining property preferences of a buyer or other users and updating these preferences as the buyer/user progresses through life.

SUMMARY

Methods, apparatus, and systems are disclosed for determining property preferences of a user. The methods, apparatus, and systems are configured to determine a user's preferences as they relate to living in their current property, preferences for a type of property given their journey in life, and preferences for a property based on preferences for neighborhoods, cities, family/friends, and/or employment situation. The methods, apparatus, and systems are configured to use one or more machine learning algorithms to classify a user into a particular category (e.g., renter, buyer, tenant, investor, seller, etc.) and one or more groups. The disclosed machine learning algorithm performs the classification using weighted variables that provide an expression of a user's preferences, which when aggregated together, form a near-complete preference profile of a user. The methods, apparatus, and systems disclosed herein use the preference profile of a user to determine which properties to recommend or otherwise assign a preference score.

The example methods, apparatus, and systems use variable inputs to the machine learning algorithm for determining classifications to generate a preference profile. The variable inputs include information regarding, for example, preferred neighborhood characteristics, user hobbies, activities, and/or interests, property purchase preferences, food preferences, property parameters, property maintenance information, and/or demographic information. The variable inputs may also include a similarity score to other users. Further, the methods, apparatus, and systems may determine one or more correlations among the variables as they relate to the different classifications.

In some embodiments, the methods, apparatus, and systems are configured to train a machine learning algorithm using known classifications, variable inputs, and property profiles. The training data set may be formed via manual profiling of a sample population of users. The machine learning algorithm may also use feedback from users after a property purchase or other life event to update relationships and/or weights between variable inputs, classifications, and property profiles. The feedback may include attributes of a purchased property to gauge which attributes were favored by the user in making the purchase. The positive attributes are cross-referenced to the variable inputs of the user for updating the classifications in the model. While feedback from one user may not significantly change the classifications, the machine learning algorithm adapts overtime as new population trends emerge.

In an embodiment, there are a total of 64 grouping possibilities for an output (from the machine learning algorithm) that is tied to a user. Overtime, the methods, apparatus, and systems are configured to track how a user moves between the groups based on their changing preferences and life events. Example possible outputs from the machine learning algorithm include a first group as to whether a user is a 'Martini Drinker' versus a 'Fixer-Upper', a second group as to whether a user is 'City' versus 'Suburb' (and/or country), a third group as to whether a user is 'Modern' versus 'Classic', a fourth group as to whether a user is 'Thrifty' versus 'Spender', a fifth group as to whether a user is 'Modest' versus 'Extravagant', a sixth group as to whether a user is 'Small Space' versus 'Large Space', a seventh group as to whether a user is 'Commuter' versus 'Walker', and an eighth group as to whether a user is 'Privacy-Oriented' versus 'Open/Friendly'. The methods, apparatus, and systems are configured to provide a weight for each group based on the user's preference of one category compared to the other groups. While each group provides a classification between two possible preferences, it should be appreciated that the classification could be provided among three or more possible preferences or the classification can be provided on a sliding scale between two possible preferences.

Together, the groups (and their corresponding weights) form a preference profile. The example methods, apparatus, and systems are configured to compare a user's preference profile to other users having similar preference profiles. The methods, apparatus, and systems determine properties that received positive feedback or have been indicated as being favorable for the matching other users as recommended properties provided to the user. Additionally or alternatively, the methods, apparatus, and systems may compare a user's preference profile to a property profile and/or neighborhood profile to identify which properties constitute a best match. The methods, apparatus, and systems provide these best matched properties as recommended properties.

Overtime, a user's behavior and/or preferences may change. The example methods, apparatus, and systems are configured to receive inputs indicative of the change, which are used as additional variable inputs to the machine learning algorithm. The methods, apparatus, and systems determine revised groups for a user to update the preference profile, thereby providing a dynamic profile that changes as a user progresses through different life stages.

The example methods, apparatus, and systems solve issues with known property management systems by being adaptive to a user's changing life. Instead of using static rules to pigeonhole a user into certain recommendations, the use of one or more machine learning algorithms enables tens to hundreds of variables to be considered in classifying a user for determining a preference profile. Accordingly, this personalization enables the methods, apparatus, and systems to provide more on-target recommendations to make property searches more efficient for users, while reducing time on market for property sellers.

In light of the present disclosure and the above aspects, it is therefore an advantage of the present disclosure to provide one or more machine learning algorithms that classify a user to determine a preference profile for providing targeted property recommendations.

It is another advantage of the present disclosure to predict from a user's preference profile when a user may become a buyer and proactively recommend properties for consideration.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Methods, apparatus, and systems are disclosed herein for using one or more machine learning algorithms to determine property recommendations for a user. The methods, apparatus, and systems may also predict when a user is likely to become a property buyer and/or seller to determine when certain property recommendations are to be made. As disclosed herein, the methods, apparatus, and systems use one or more machine learning algorithms to determine a dynamic preference profile for a user that accurately reflects the user and how the user changes over time. The preference profile takes into account property-related information and user characteristic information as variables to enable the machine learning algorithm(s) to determine a preference profile.

As disclosed herein, the preference profile includes a category that indicates whether a user is most likely a buyer, a seller, a renter, a tenant, and/or an investor. The category is used to determine which types of information are provided to a user. For example, property recommendations are provided for users that are determined to be buyers or tenants/renters that are predicted to transition to buyers within a certain time period (e.g., one month, three months, six months, etc.). In another example, the methods, apparatus, and systems provide recommendations for listing agents and home staging for users determined to be sellers. In yet another example, the methods, apparatus, and systems provide recommendations for home improvement/repairs services for users determined to be long term tenants. In some embodiments, the methods, apparatus, and systems are configured to use machine learning to predict a likelihood that a user is about to or may change categories within a certain time period. The prediction may be used to proactively provide recommendations, which may sway a user into changing categories more quickly (e.g., deciding to buy a property earlier than planned when recommended homes are provided).

Figure 1:
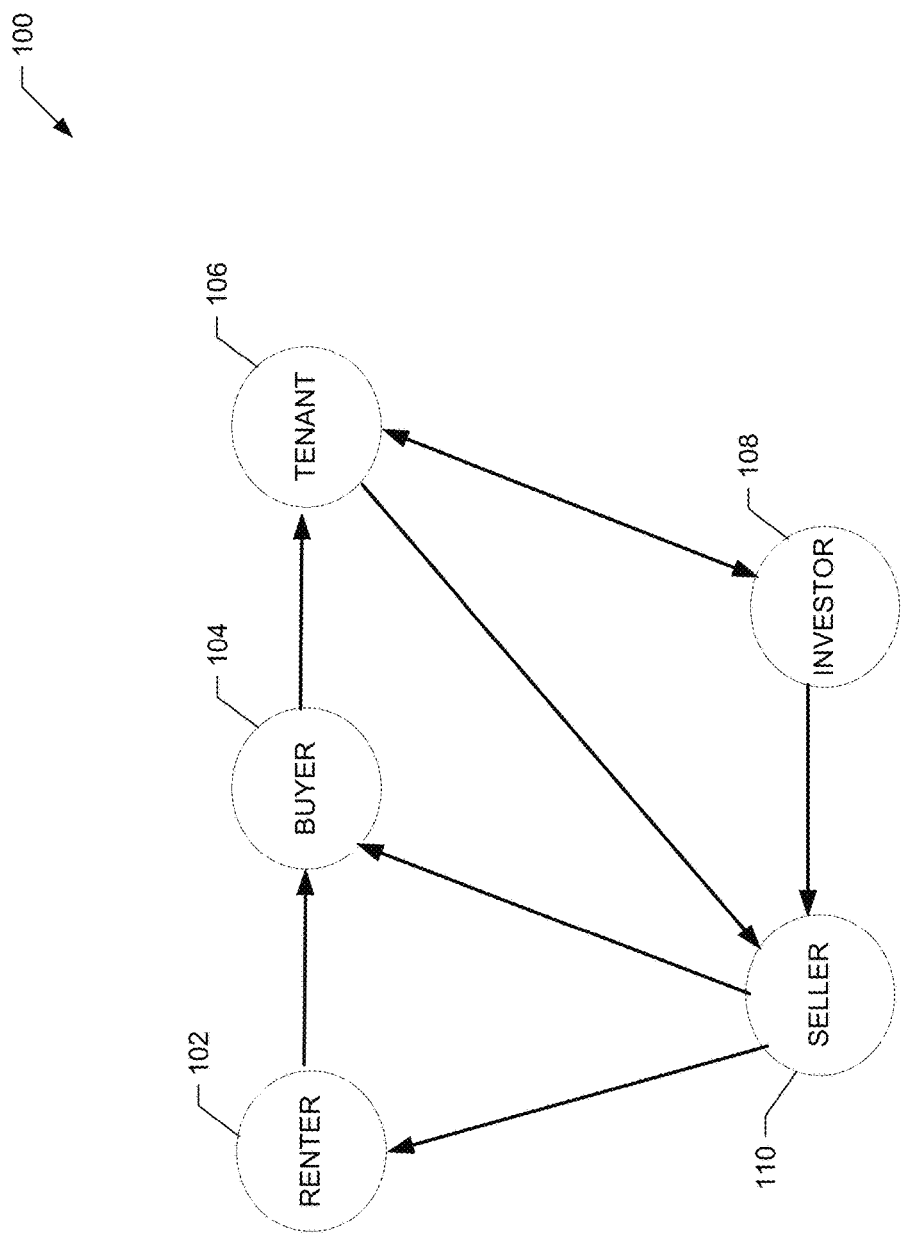
FIG. 1 is a diagram illustrative of the different possible categories for a user, according to an example embodiment of the present disclosure.

FIG. 1 is a diagram illustrative of the different possible categories for a user 100, according to an example embodiment of the present disclosure. The categories include a renter category 102, a buyer category 104, and a tenant category 106 (e.g., a buyer who is residing at a property). The renter category 102 refers to a user who rents a property, such as an apartment or a house alone or with other individuals. The buyer category 104 refers to a user who is in the process of purchasing a property. This includes someone who is in a search phase or about to be in a search phase. The tenant category 106 refers to a user living in a property they purchased. For the user 100, there is a possible progression from the renter category 102 to the buyer category 104 and to the tenant category 106. A user in the tenant category 106 includes a primary property. A user in the tenant category 106 may also include secondary properties.

FIG. 1 also shows an investor category 108 and a seller category 110. The investor category 108 refers to a user who owns or in the process of owning one or more properties as an investment or cash-flow asset. A user with a primary property and investment properties may be classified in both the tenant category 106 and the investor category 108. When the user 100 is in the tenant category 106, the user 100 may transition to the investor category 108 if additional properties are purchased. When the user 100 is in the tenant category 106 or the investor category 108, the user 100 may transition to the seller category 110. A user in the seller category 110 refers to a user who is in the process of selling a property, and includes users who are about to sell their property in the near future. From the seller category 110, the user 100 may transition to the renter category 102 or the buyer category 104.

Each category 102 to 110 of FIG. 1 may represent a web or interrelation of certain user information at a specific moment in time. As more data is obtained about the user, the web of information becomes more sophisticated and nuanced, enabling connections and transitions between the different categories 102 to 110 as the user 100 moves through life's journey.

In addition to a user category, the preference profile includes an identification as to which attributes of certain groups a user is associated. The groups provide a classification of a user that enables recommendations and predictions to be made. The groups may include, for example, a location group that has attributes of urban, suburban, exurban, or rural. Other groups may include a do-it-yourself ("DIY") group with attributes indicative as to how much a user prefers performing property repairs and/or renovations themselves. Further groups may include a style group (e.g., modern, classic, mid-century, etc.), a spend group (e.g., thrifty, spender, etc.), a space group (micro, small, average, large, mcmansion, estate, etc.), a commute group (e.g., walking, public transit, car, etc.), a privacy group (e.g., private, open, etc.), and a showcase group (e.g., modest, extravagant, etc.). The machine learning algorithm determines at least one attribute from each group for a user as part of the preference profile.

The disclosed methods, apparatus, and systems are configured to compare a preference profile of a user to neighborhood profiles, property profiles, and/or preference profiles of other users. Based on matches between profiles, the methods, apparatus, and systems are configured to determine recommendations for the user. In some embodiments, the methods, apparatus, and systems may determine that a user is similar to other users that are categorized as buyers, but the user is currently categorized as a renter. The methods, apparatus, and systems are configured to use this determination to predict, for example, that the user is likely to become a buyer. The methods, apparatus, and systems accordingly are configured to begin recommending matching properties to the user based on the prediction the user will become a buyer.

Reference is made herein to variables for a machine learning algorithm. As disclosed herein, the variables are inputs into the machine learning algorithm for category and group classification. The variables include user characteristic information, which includes data indicative of information related to a user. In some instances, the user characteristic information may be compared to property information and/or neighborhood information to determine matches to certain property types/neighborhoods for group classification. Data for the variables may be received from various sources including property websites, user feedback, and/or third-party information sources.

As mention above, reference is made herein to user characteristic information. As disclosed herein, user characteristic information includes any information that is related to a user that may be determined or otherwise received by the methods, apparatus, and systems disclosed herein. The user characteristic information may be collected by monitoring property-related web browsing information (e.g., reading cookies on a user's web browser or monitoring interaction with a real estate web page/app), may be entered by a user during a registration process, and/or may be obtained from public records, such as property transaction information. The user characteristic information may also include third-party variable data sources such as credit scores, employment status (e.g., information from a LinkedIn® profile or company webpage), and/or social media information. In some examples, the user characteristic information may include real estate search and/or browsing information including information indicative of a viewed neighborhood, zip code, or town in addition to residence type (e.g., home, apartment, condominium, etc.), purchase price, square footage, property features (e.g., pet friendly, pool, garage, single-level, etc.) and/or area features (e.g., parks, public transit, schools, shopping, freeway access, etc.). The user characteristic information may also include user state information (e.g., home ownership journey information), which is indicative as to whether the user is a renter, a buyer, a tenant, a seller, and/or an investor.

I. PROPERTY RECOMMENDATION SYSTEM

Figure 2:
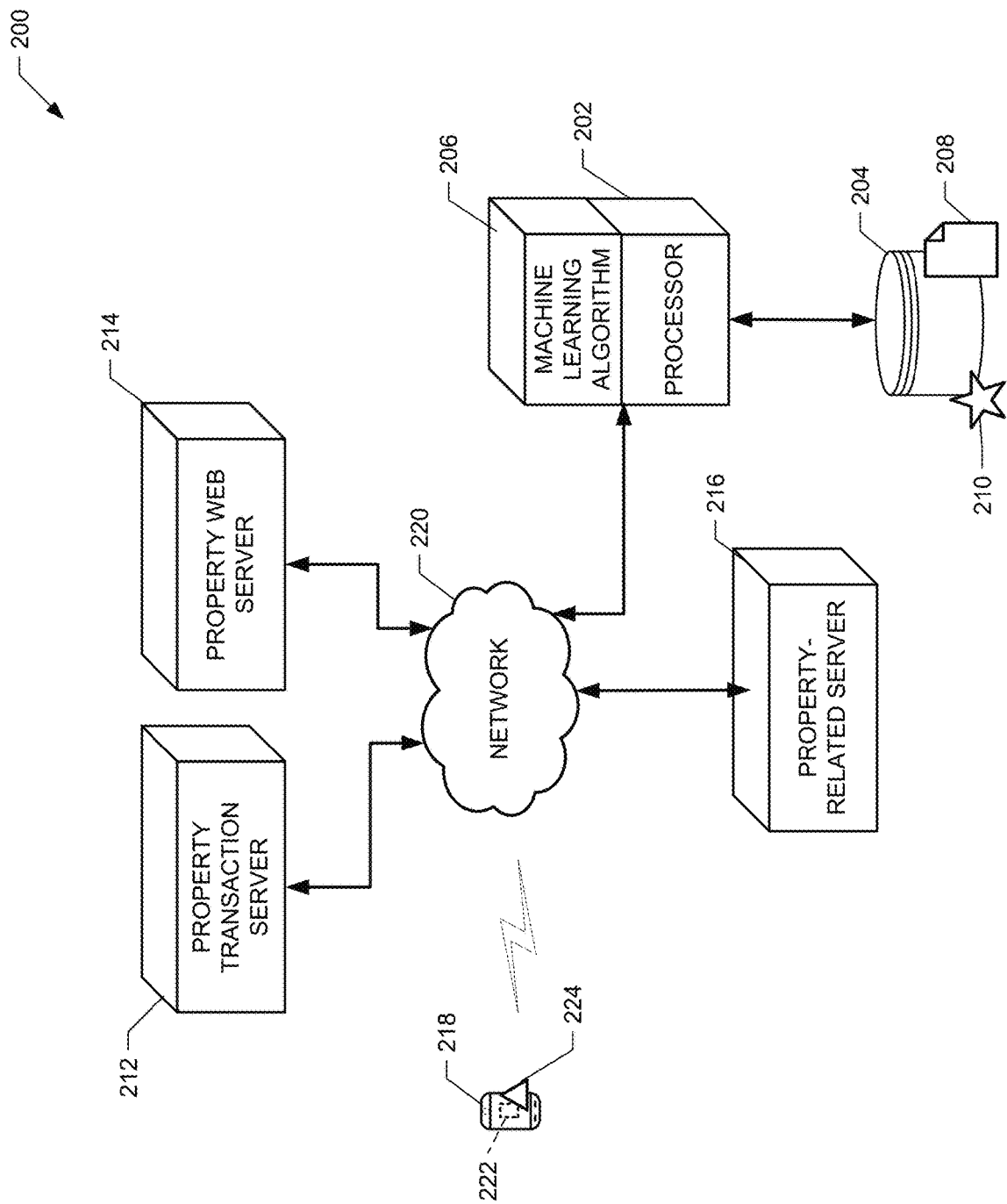
FIG. 2 is a diagram of an example property recommendation system, according to an example embodiment of the present disclosure.

FIG. 2 is a diagram of a property recommendation system 200, according to an example embodiment of the present disclosure. The example system 200 includes a processor 202 communicatively coupled to a memory device 204. The processor 202 may include a server, a cloud computing or distributive computing system, a workstation, a computer, a controller, a logic circuit, etc. The memory device 204 may include any flash or solid state data storage device including random access memory ("RAM"), read only memory ("ROM"), electrically erasable programmable read-only memory ("EEPROM"), a solid state drive ("SSD"), a hard disk drive ("HDD"), etc.

The example memory device 204 includes one or more computer-readable instructions. Execution of the one or more computer-readable instructions by the processor 202 enables the processor 202 to perform the operations described herein. Further, the one or more instructions may define one or more interfaces (e.g., application programming interfaces ("APIs")) for receiving and/or transmitting structured information. The one or more instructions may also define one or more machine learning algorithms 206, discussed in more detail in connection with FIG. 3.

The memory device 204 is configured to store user characteristic information 208 and/or preference profiles 210 for a plurality of users. The memory device 204 may create a data structure, file, record, etc. for each user, which may be linked or otherwise associated with a respective preference profile 210. The user characteristic information 208 includes, for example, property transaction information and property-related web browsing information. The property transaction information includes data that is indicative of a property transfer between a buyer and a seller. The property transaction information may include a transaction date, buyer names, seller names, a purchase price, and/or a property address or identification number. The property transaction information may be accessed or otherwise received from a property transaction server 212 (e.g., a state or county property deed computing system or a local news website).

In addition to above, the property transaction information may also be entered by a user during or after registration with the processor 202. For example, a user may enter a purchase price, a mortgage amount, and an address of an owned or recently purchased property. The property transaction information may further include rental information for a user, such as a rental address, a monthly rent, etc.

The property-related web browsing information includes data that is indicative of a user's interaction with one or more websites that relate to property information. The property-related web browsing information may be accessed or otherwise received in the processor 202 from a property web server 214. The property-related web browsing information may include real estate searches conducted through a real estate search engine, properties viewed through a real estate website, and/or property tours conducted through a property application that is configured to prompt users for feedback regarding the property, specific rooms, and/or specific property features. In these instances, the property-related web browsing information may include neighborhood property data that is indicative of property addresses, neighborhoods of properties viewed/searched, an average sale/listing property price, an average property transaction price, an average property square footage, an average year built, a distance from public transportation, a public school ranking, an average distance from a body of water, an average distance from a city center, and/or a median property type. The property-related web browsing information may also include property information of properties stored to a user's favorites list.

The property-related web browsing information may also include additional information that relates to property ownership. For example, the property-related web browsing information may include information related to browsing mortgage or refinancing information, information related to home services (e.g., landscaping, handyman, snow removal, decorating, maid service, etc.), information related to renovation, information related to property improvements/fixes, and/or information related to property restoration (e.g., information provided by a property-related server 216). The property-related web browsing information may be obtained via cookies or other web usage tracking features on a user device 218. Alternatively, the property-related web browsing information may be obtained via linked user accounts from the property web server 214. Further, the property-related web browsing information may be obtained via app usage monitoring on the user device 218. In some instances, the property-related web browsing information may include information from scanning a user's email account and/or social media accounts, if permission is granted.

In the illustrated example of FIG. 2, the user device 218 is communicatively coupled to the processor 202 via a network 220. The example network 220 may include any local area network, wide area network, cellular network, and/or combinations thereof. For example, the network 220 may include a wireless local area network, the Internet, and a cellular 5G or 6G network.

The user device 218 may include a smartphone, a tablet computer, a laptop computer, a desktop computer, or a workstation. The user device 218 includes an application 222 configured to display property recommendations 224 and/or recommendations for property selling, renovations, repair, etc. based on a determined category of a user. The property recommendations 224 may include a list of properties including an identifier such as an address and a link to an online or virtual real estate listing for the property. The property recommendations 224 may also include one or more images or videos of each property. In some embodiments, the property recommendations 224 include a virtual pamphlet or magazine that provides pictures, video, property descriptions, and/or interactive elements in a sequential manner that is ordered based on a degree of a match with the user.

The application 222 is defined by one or more instructions stored in a memory device of the user device 218. Execution of the one or more instructions by a processor of the user device 218 causes the user device 218 to perform the operations disclosed herein. The application 222 may include a mobile application, such as a real estate application. In this embodiment, the recommendations 224 are provided through the application 222. In yet other examples, the application 222 may include a web browser. In these other examples, the property recommendations 224 are displayed via the web browser.

II. MACHINE LEARNING ALGORITHM EMBODIMENT

Figure 3:
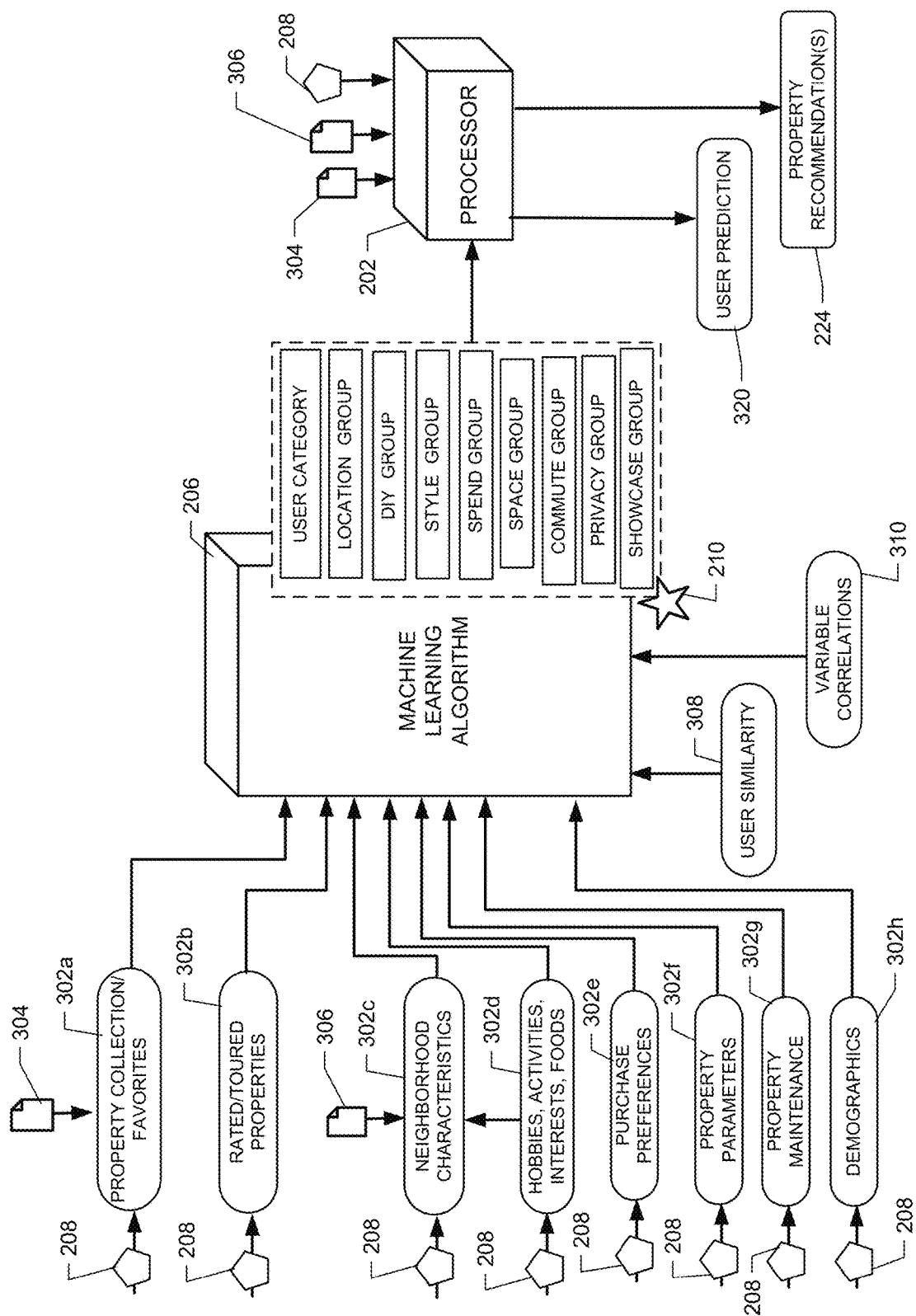
FIG. 3 is a diagram of a machine learning algorithm, according to an example embodiment of the present disclosure.

FIG. 3 is a diagram of the machine learning algorithm 206 of FIG. 2, according to an example embodiment of the present disclosure. In the illustrated example, the machine learning algorithm 206 is configured to receive and process a plurality of input variables 302. The input variables include a property collection/favorites input variable 302a, a rated/toured properties input variable 302b, a neighborhood characteristics input variable 302c, a hobbies, activities, interest, foods input variable 302d, a purchase preferences input variable 302e, a property parameters input variable 302f, a property maintenance input variable 302g, and a demographics input variable 302h. It should be appreciated that the machine learning algorithm 206 may include additional input variables or fewer input variables in other embodiments. For example, the hobbies, activities, interest, foods input variable 302e may be omitted and/or a climate/region input variable may be added.

Figure 4:
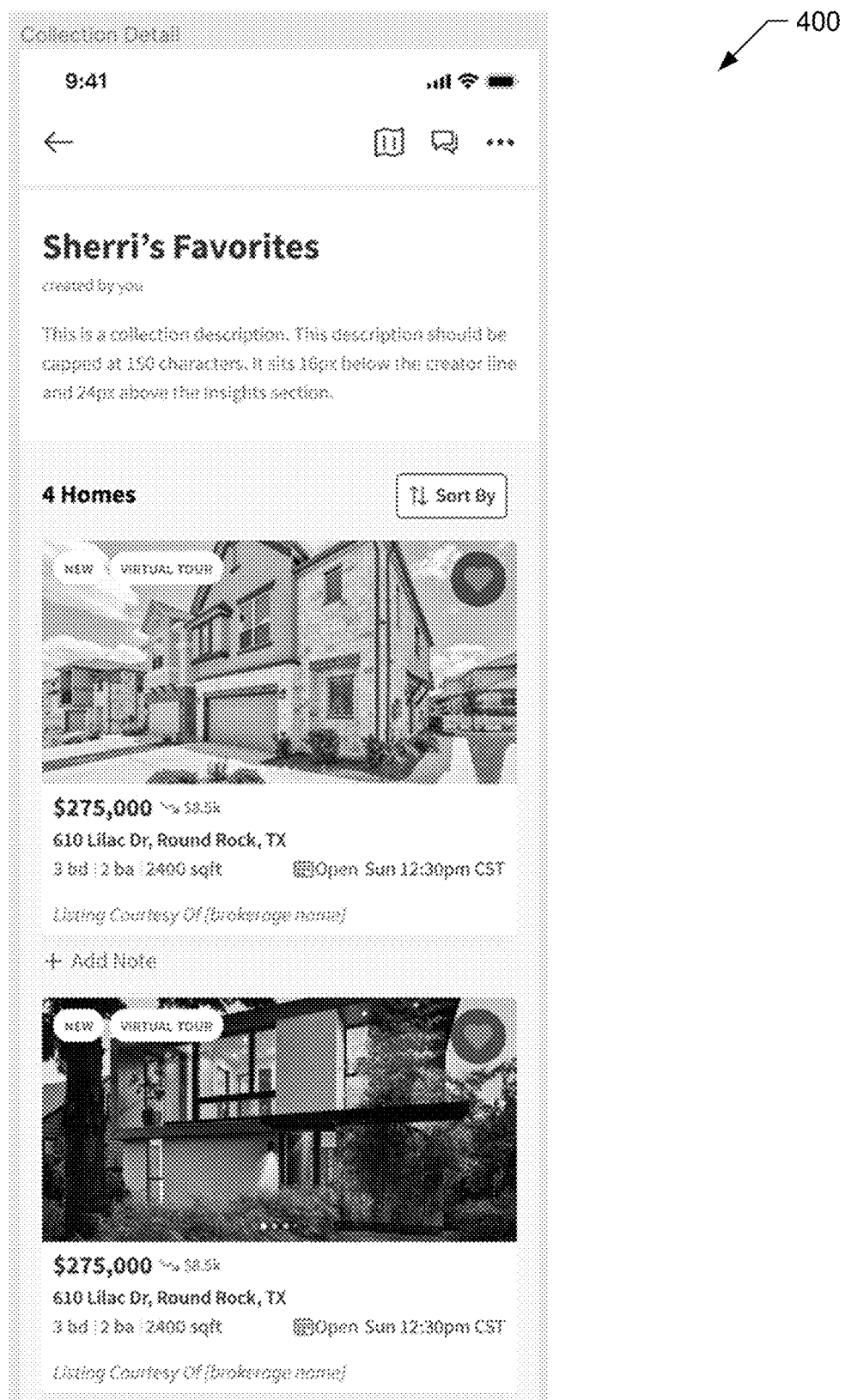
FIG. 4 is a diagram of a user interface of an application showing properties added by a user to a collection list, according to an example embodiment of the present disclosure.

The property collection/favorites input variable 302a corresponds to properties that a user has added to a collection or favorites list as part of their user characteristic information 208. FIG. 4 is a diagram of a user interface 400 of the application 222 showing properties added by a user to a collection list, according to an example embodiment of the present disclosure. An identifier of each of the properties in the list is compared to a property database 304, which provides a feature list of each available property. In some embodiments, the machine learning algorithm 206 is configured to extract features from properties using a classifier. In some embodiments, the machine learning algorithm 206 is configured to perform image analysis to identify features in one or more listing photos, such as a feature material, a feature color, and/or a presence of a feature. Property features can include fixtures such as appliances, countertops, cabinets, window treatments, etc. Property features can also include wall color, room shape, room size, layout, etc.

In an example, the machine learning algorithm 206 may analyze images to classify a room type, such as kitchen, bathroom, etc. using identified features, window placement, etc. The machine learning algorithm 206 then identifies certain colors in images of the rooms. The color classification may include a color data point. The machine learning algorithm 206 may run pixels associated with each feature through a color classifier. The output is the color that has the closest similarity to the colors represented in the pixel is displayed and added as an augmented data point to the feature. In an example, the machine learning algorithm 206 may determine a Himalayan Pink color for a granite countertop property feature.

Features of matching properties are passed to the machine learning algorithm 206 via the property collection/favorites input variable 302a. The machine learning algorithm 206 may determine if there are multiple matching properties that have at least some matching features. If there are multiple matching properties, the machine learning algorithm 206 is configured to add a multiplier to a confidence level for the matching features as an indication as to how important that feature is to the user. Such features may include a rain shower in a master bathroom, a basement theater, a gourmet kitchen, cork floors, etc. The machine learning algorithm 206 is configured to identify common features that are present in most, if not all properties, to prevent weights from being added to these, which prevents common features from out weighing other more important features. Such common features may include a master bedroom, white walls, a presence of a basement, etc.

Figure 5:
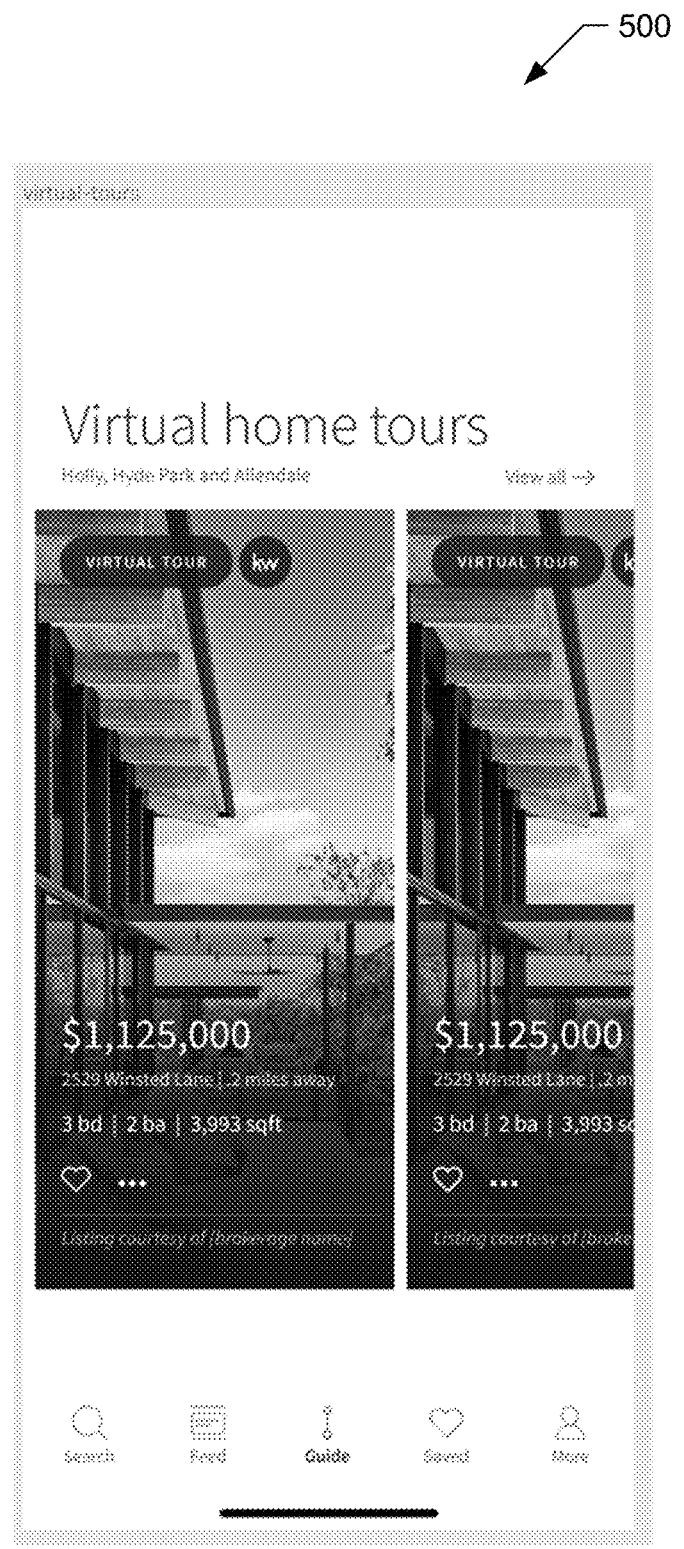
FIG. 5 is a diagram of a user interface of an application for a property tour, according to an example embodiment of the present disclosure.

The machine learning algorithm 206 uses the rated/toured properties input variable 302b to also identify property features that are important to a user. In some embodiments, the application 222 is configured to provide a virtual property tour, as shown in user interface 500 of FIG. 5. The virtual property tour provides a description and images/video of rooms in a property. The application 222 is configured to prompt feedback from a user for the property generally, each room, and features in the rooms. For example, a user may select an icon indicating they like a certain room or a feature in a certain room. The feedback is stored as user characteristic information 208, and includes positive and negative impressions for properties, rooms, and/or property features. The machine learning algorithm 206 receives the user feedback through the rated/toured properties input variable 302b, where features with a positive rating are given greater weights. The machine learning algorithm 206 may give features with negative ratings a low weight or fractional weight to ensure recommended properties include as few negative features as possible. The machine learning algorithm 206 may use multiple weights for similar features that are liked across multiple rated/toured properties.

Returning to FIG. 3, the neighborhood characteristics input variable 302c is configured to provide an input to the machine learning algorithm 206 regarding which neighborhood characteristics a user prefers. The information for the input variable 302c may be both qualitative and quantitative data. The machine learning algorithm 206 compares the user characteristic information 208 to neighborhood profiles 306 that are stored in a database. Matches between the user characteristic information 208 and information in the neighborhood profiles 306 are assigned a greater weight. The machine learning algorithm 206 uses the weights for identifying which neighborhood characteristics are important to a user. The machine learning algorithm 206 is configured to select properties that are in neighborhoods that have characteristics that match at least some of the user characteristic information 208.

Figure 6:
FIG. 6 is a diagram of a user interface of an application showing various neighborhood characteristic information, according to an example embodiment of the present disclosure.

FIG. 6 is a diagram of a user interface 600 of the application 222 showing various neighborhood characteristic information 306, according to an example embodiment of the present disclosure. As shown, the neighborhood characteristic information 306 includes quantitative data such as: Average Price of Home, Average SQFT of Home, Average Price/SQFT of Home, Average age of Home, Buyer/Seller Market, Months of Inventory, Price to List Ratio, Income Demographics, Average adjusted gross income ("AGI"), Poverty Level, Average Property Tax including Price/SQFT for Home and/or Price/SQFT for Neighborhood, Average HOA Fee, GDP Growth Trend of City that the neighborhood exists within, Forecast of Neighborhood prices over an undetermined or selected period of time, and/or Weather patterns. The neighborhood characteristic information 306 includes qualitative data about living in the neighborhood, which may be extracted from other users that live in the neighborhood, social media, etc. The qualitative data includes indications of, for example, Book lovers, Car enthusiasts, Garden enthusiasts & plant enthusiasts, Natural Beauty, Wanderlust, Handcrafted, Animal Activism, Dog Lovers, Smoke Culture, Daily Grind, Nerd Culture, LGBTQ Culture, Wealth Signaling, Hipster, Student, Farm Culture, Love & Romance, Happily Ever After, Dating Life, Motherhood, Family Time, Friends, Girl Squad, Networking, Deserts, Coffee Shop Lovers, Trendy Eats, Whiskey Business, Asian Food & Culture, Farm to Table, Fueling for Fitness, Wine Lovers, Hops & brews, Film lovers, Competitive Nature, Live experiences, Late-night leisure, Party Life, Live & Local Music, Lighthearted Fun, Deep Emotions, Heartfelt Sharing, Awestruck, Happy Place, Gratitude, Memory Lane, Dance Devotion, Artistic Appreciation, Pieces of History, Sites To See, Hip Hop Culture, Mindfulness & Spirituality, Activism, Politically Engaged, Praise & Worship, Conservation, Civic Attentiveness, Trend Trackers, All About Hard, Mens Style, Fitness Fashion, Body Art, Smart Chic, Home & Leisure, Past Reflections, Humanitarian, Deal Seekers, Organized Sports, Fitness Obsession, Outdoor Adventures, Yoga Advocates, and/or Functional Fitness. The qualitative data and quantitative data combine to create a unique profile for every neighborhood. The neighborhood characteristic information 306 may also consist as snapshots over time to indicate the changing preferences of a neighborhood.

Figure 7:
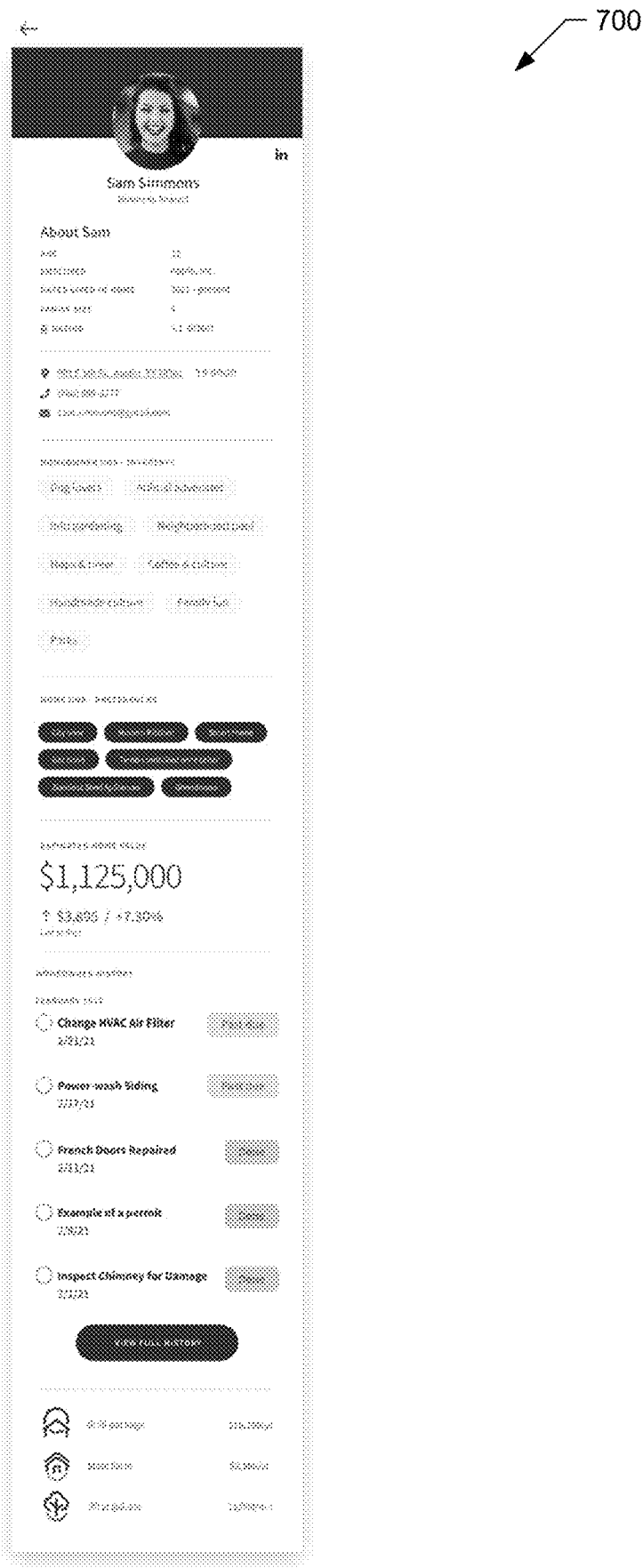
FIG. 7 is a diagram of a user interface of an application showing collected user characteristic information including hobbies, interest, activities, and food preferences, which are used for property recommendations, according to an example embodiment of the present disclosure.

The hobbies, activities, interest, and foods input variable 302d corresponds to a variable that gauges a user's hobbies, interest, activities, and food preferences. The application 222 may prompt a user periodically with one or more survey questions for collection of hobby, interest, activity, and food information as user characteristic information 208. The processor 202 may also obtain user characteristic information 208 from third-party sites, such as a food order system, for food preferences. The machine learning algorithm 206 is configured to use user characteristic information 208 provided through the hobbies, activities, interest, foods input variable 302d for comparison against the neighborhood characteristic information 306. As such, the machine learning algorithm 206 searches for neighborhoods that can facilitate such hobbies, activities, interests, and food preferences or find neighborhoods that have the short commutes/distances in terms of accessing the above. The property in a selected neighborhood is used as the origin point and each hobby/activity/interest/food preference has an aggregated and average distance for access that is added as a weight point within an array. The closer a neighborhood is to the access points above, the higher its relevance score is for the machine learning algorithm 206. In other words, properties are weighted for recommendations based on being located in a neighborhood that has characteristics that match hobbies, activities, interests, and food preferences of a user. FIG. 7 is a diagram of a user interface 700 of the application 222 showing collected user characteristic information 208 including hobbies, interest, activities, and food preferences, which are used for property recommendations.

The purchase preferences input variable 302e of the machine learning algorithm 206 includes user characteristic information 208 regarding purchases of furniture, home décor, renovation, and repair. The processor 202 may receive information from third-party websites regarding purchases. The application 222 may also prompt for this information. This information is aggregated as user characteristic information 208. The machine learning algorithm 206 may extract and classify a description for each product purchased for a property. Similar to property features, the machine learning algorithm 206 is configured to compare the extracted descriptions to the neighborhood characteristic information 306 and/or the property database 304 to determine matching properties and/or neighborhoods. Properties and/or neighborhoods that match descriptions of purchased property goods or services are assigned a greater weight, with multiple matching properties being assigned a multiplier. The machine learning algorithm 206 may also take into account a user similarity 308 with other users to determine other users who have similar tastes to identify additional properties.

Returning to FIG. 3, the property parameters input variable 302f corresponds to user characteristic information 208 regarding features of properties desired. The features may include a number of bedrooms, a number of bathrooms, a garage size, a square footage, a price per square foot, etc. The processor 202 may receive this user characteristic information 208 for the input variable 302f from the property web server 214 and/or the application 222. The information may be based on previous searches for properties or answers to prompts for desired properties.

The property maintenance input variable 302g corresponds to a user's property health score. The user characteristic information 208 may include information entered by a user regarding repairs or renovations to their current property. Additionally or alternatively, the processor 202 may receive information from contractors or repair personal regarding work performed on a property of a user. A bottom section of the user interface 700 of FIG. 7 shows some products and services performed by a user and recorded as user characteristic information 208 for the purchase preferences input variable 302e. The example machine learning algorithm 206 is configured to determine how well a user maintains their property using the user characteristic information 208. A user with lower maintenance scores may cause the machine learning algorithm 206 to more heavily weigh newer properties that require less maintenance. The machine learning algorithm 206 may take into account all properties lived in by a user, with more recent properties given a greater weight.

The demographics input variable 302h takes into account a user's demographics as provided in the user characteristic information 208. The demographic information may include a user's income, expenses, mortgage, current employment, past employment, current and previous job responsibilities, work distance from a current property, age range, family status, material status, affordability calculator information, and/or a number of children. The machine learning algorithm 206 uses the demographics input variable 302h to weight properties that are within a price range and/or work distance from a user. The machine learning algorithm 206 may also use age and family for weighing properties with an appropriate number of bedrooms/bathrooms in corresponding neighborhoods.

Figure 8:
FIGS. 8 and 9 are diagrams of user interfaces of an application providing prompts for a user to enter user characteristic information, according to an example embodiment of the present disclosure.
Figure 9:
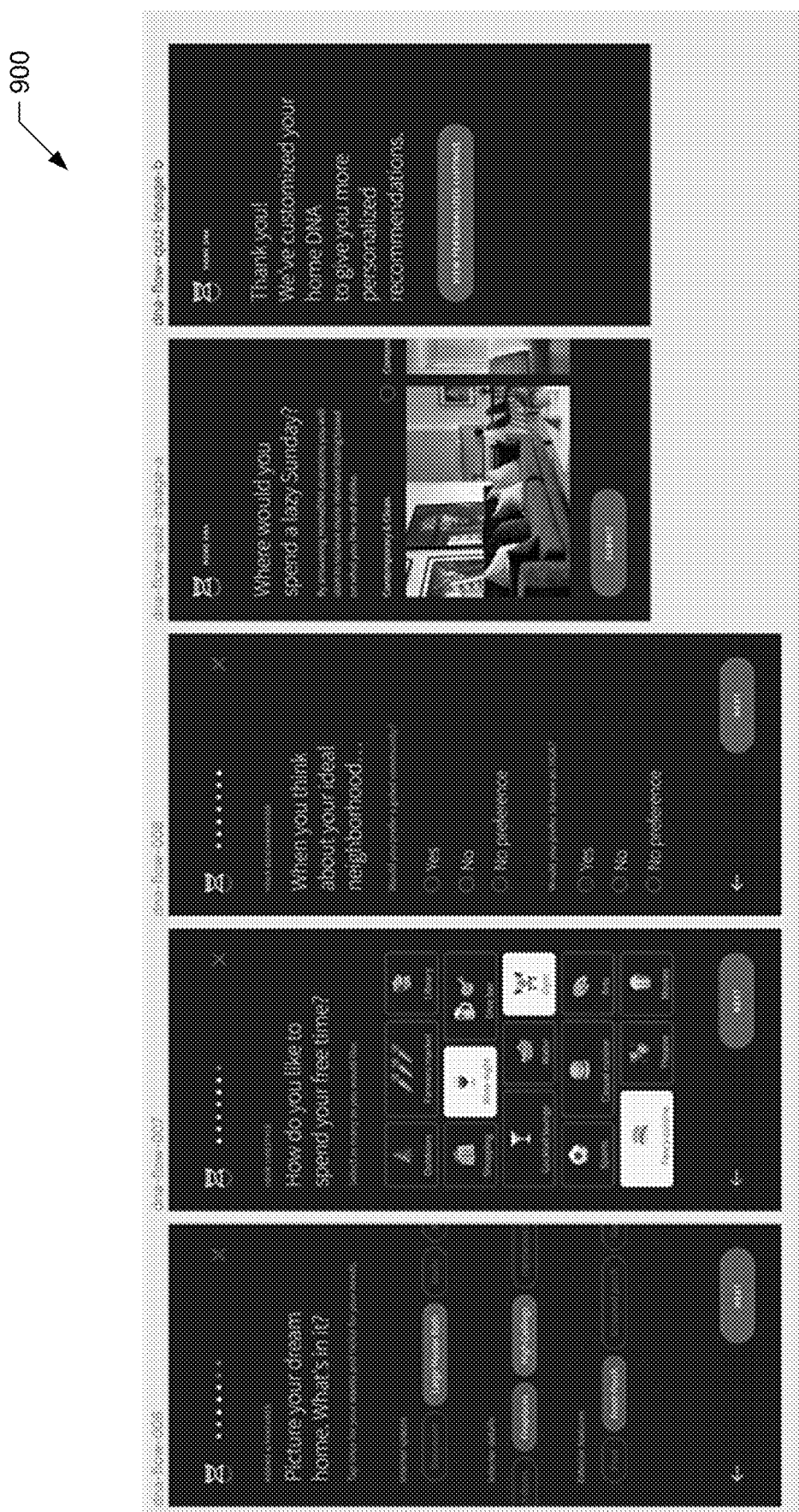

As mentioned above, the application 222 is configured to prompt a user for user characteristic information 208. The application 222 may be configured to provide the prompts at regular intervals throughout the potential consumer experiences, such as during or after virtual property tours. Outputs from the prompts are classified by the machine learning algorithm 206 as the user characteristic information 208 for population into the appropriate variable 302. In some embodiments, the processor 202 causes the application 222 to personalize the prompts using, for example, a determined user category (e.g., buyer, renter, etc.) and/or already collected user characteristic information 208. For example, after determining that a user desires a gourmet kitchen, the processor 202 identifies common features of gourmet kitchens to gauge a user's interest, such as appliance brands, island configuration, countertop material/color, cabinet color, etc. Feedback from users enables the machine learning algorithm 206 to provide even more personalized recommendations. FIGS. 8 and 9 are diagrams of user interfaces 800 and 900 of the application 222 providing prompts for a user to enter user characteristic information 208. The prompts include a desired number of bedrooms, a desired number of bathrooms, a preferred decorative style for different room types, room preferences, home feature preferences, and personal preferences.

The example machine learning algorithm 206 may also take into account a user similarity 308 and variable correlations 310. The user similarity 308 is a variable that assigns a similarity score to an undetermined number of groups of users. The group that has the strongest similarity score 308 to the user has its data used in recommendations for the user once that group has reached a critical threshold of users, where statistical significance can be inferred. Possible recommendations may be based on properties of users like them that have rated or favored those properties, property features of users like them that have rated or favored those property features, property good/item purchases of users like them that have rated or favored those property good/item purchases, and/or property maintenance/home improvement of users like them that have rated or favored that maintenance/home improvement.

The machine learning algorithm 206 also takes into account a correlation between variables 310. The correlation may weight each of the variables 302 to the other variables 302 regarding, The correlation may indicate which variable 302 is more important to a user and/or which variable 302 is associated with more information for making an informed recommendation. The correlation variable 310 may be a model of a models, whose main purpose is to determine the key variables 302 that are driving the purchase behavior of a user, which is then used to drive a highly personalized experience that provides the right type of recommendations.

As shown in FIG. 3, the example machine learning algorithm 206 is configured to create a user preference profile 210 using the weighted inputs 302, 308, 310, the neighborhood profiles 306, and the property profiles 304. The generated outputs classify a user into a user category (e.g., buyer, seller, etc.) and one or more attributes of one or more groups. The strength of the classification may be indicated on a scale of 0 to 50, for example. The machine learning algorithm 206 may classify more than one attribute per group and/or user category. As shown in FIG. 3, the groups include a location group, a DIY group, a style group, a spend group, a space group, a commute group, a privacy group, and a showcase group. As discussed above, each group includes at least two attributes, with at least one attribute being assigned to the user through machine learning. In one example, the machine learning algorithm 206 determines that a user is classified as a buyer for the user category and has the following attributes (with corresponding classification strength indication): Martini Drinker (DIY—25), City (Location—45), Modern (Style—48), Spender (Spend—32), Extravagant (Showcase—41), Small Space (Space—15), Walker (Commute—37), Open/Friendly (Privacy—5).

The example processor 202 is configured to use the preference profile 210 in addition to the neighborhood profiles 306, the property profiles 304, and/or the user characteristic information 208 to determine a user prediction 320 and/or a property recommendation 224. In an example, the processor 202 compares the group attributes to attributes of other users. The processor 202 identifies properties liked and/or owned by those other matching users for recommendations. The processor 202 also compares the group attributes to the neighborhood profiles 306 and/or the property profiles 304 to identify matching or closely matching properties that are listed on one or more multiple listing services.

The processor 202 is configured to transmit the property recommendations 224 to the user device 218 for display by the application 222. In some embodiments, the processor 202 includes one or more APIs for providing the property recommendations 224 from the machine learning algorithm 206 to the application 222. In some embodiments, the processor 202 and/or the machine learning algorithm 206 determine that a property recommendation 224 is not needed for a user based on the determined user category. For example, the processor 202 and/or the machine learning algorithm 206 is configured that property recommendation 224 are not to be provided for users in the tenant category 106.

Figure 10:
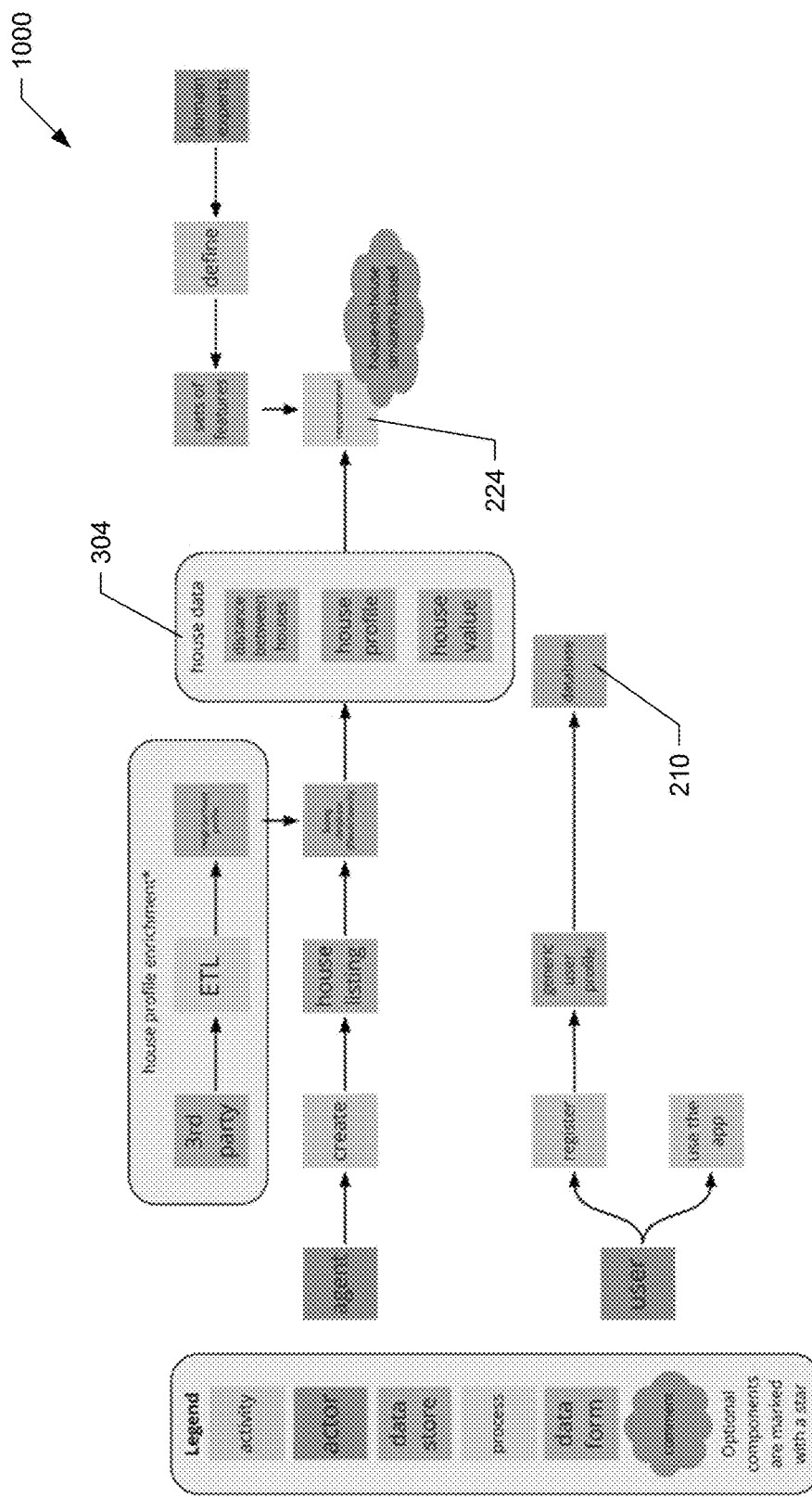
FIGS. 10 to 12 are diagrams of example process flows performed by a processor using group attributes of a user to determine property recommendations, according to an example embodiment of the present disclosure.
Figure 11:
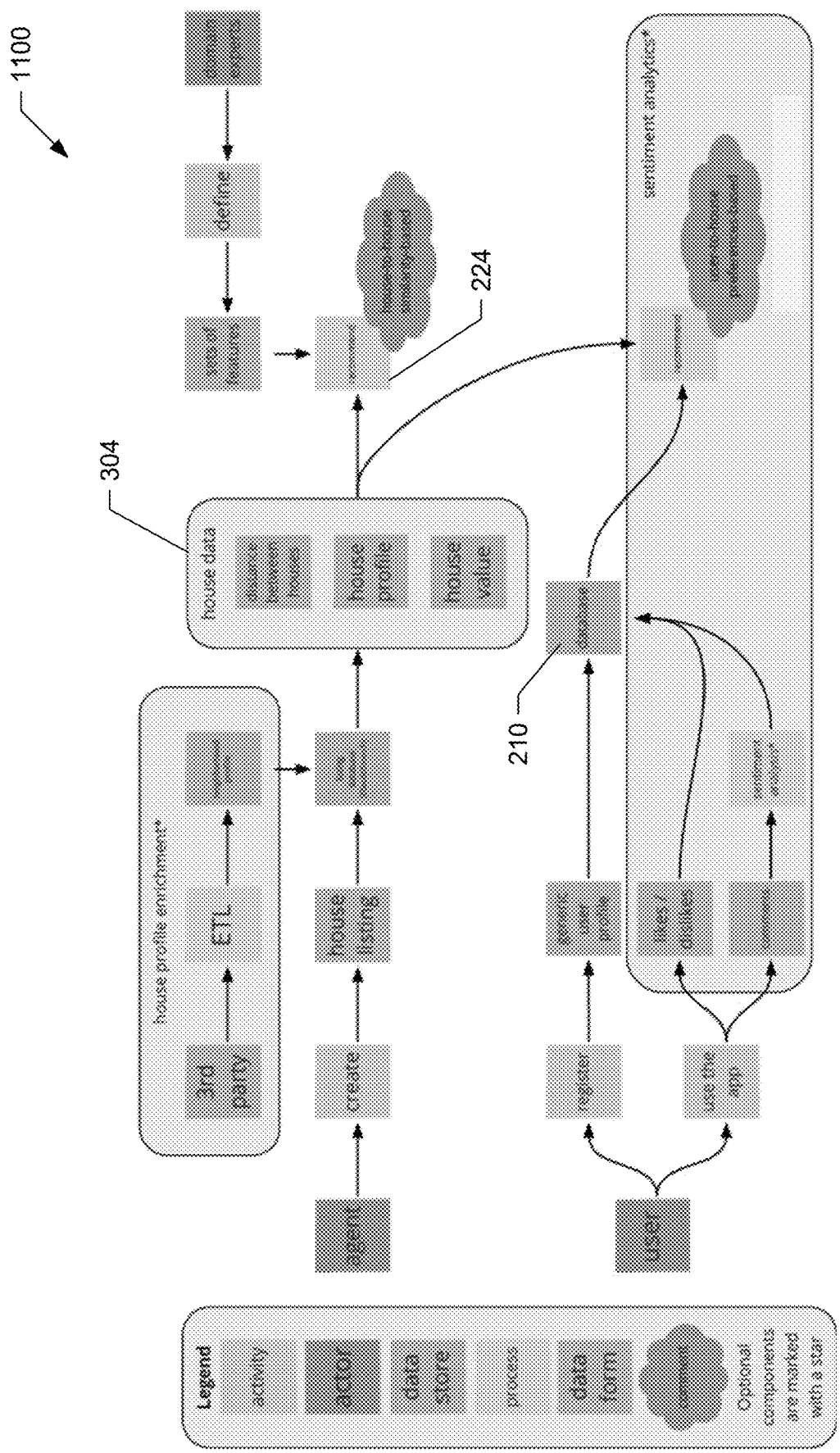
Figure 12:
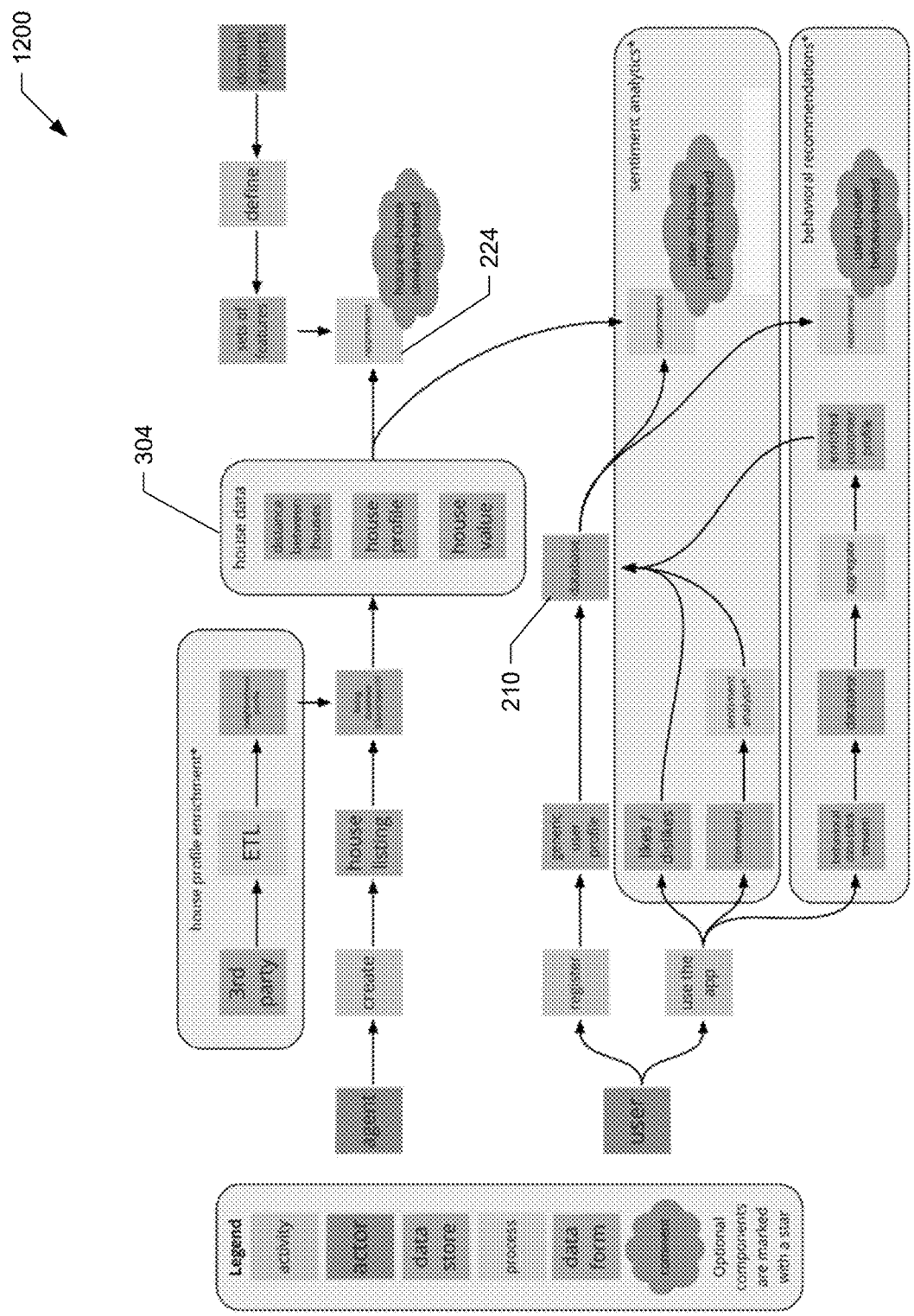

FIGS. 10 to 12 are diagrams of example process flows 1000, 1100, and 1200 performed by the processor 202 using the group attributes to determine property recommendations 224, according to an example embodiment of the present disclosure. The property recommendations 224 are transmitted to the application 222 for display as recommended properties to purchase. The processor 202 is configured to limit the properties that are currently listed for sale among all the properties listed in databases one or more multiple listing services. In some embodiments, the processor 202 may also recommend properties that are predicted to go on sale based on determining that a tenant of the property is likely to transition to a seller.

The user predictions 320 determine the likelihood that a user remains in or changes a user category. The user predictions 320 enable the processor 202 to being recommending properties to tenants and renters before they officially begin their property search. The user predictions 320 also determine other information that may be displayed to a user. For example, detection of a user being a tenant or renter with a little chance of becoming a buyer causes the processor 202 to not send property recommendations. Instead, the processor 202 is configured to transmit recommendations for property repair, maintenance, and/or renovation. The user predictions 320 may take into account changes in a user's life that may trigger a transition to another category, such as marriage, divorce, having children, job chance, becoming an empty nester, retirement, etc.

In some embodiments, the user predictions 320 include one or more properties that a user is likely to purchase. The predicted purchase decisions incorporate past data from the user as well as data from other users that have a similar past. The user predictions 320 also take into account the economic growth rate of the city that a user lives in or may want to live in, based on certain variables matching up within their preference profile 210. The economic growth rate is added as weight tied to the predicted income of a user, thus enabling the machine learning algorithm 206 to recommend properties that may fit in future scenarios as well.

III. CONCLUSION

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for recommending a property from a plurality of properties to a user, the method comprising the following steps that are each executed using a machine learning algorithm:
   receiving user characteristic information;
   receiving property profile information;
   receiving neighborhood characteristic information;
   classifying the user characteristic information, the property profile information, and the neighborhood characteristic information into at least two different input variables;
   using the classified input variables to determine:
      a user category, among a plurality of possible user categories including a renter category, a buyer category, a seller category, a tenant and an investor, and at least one attribute of at least one group;
   determining a strength of the classification associated with each of the at least one attribute of the at least one group, wherein the classification strength impacts the property recommendation, wherein the classification strength is on a scale of 1 to 50;
   analyzing images of the properties to identify features in the images;
   if the user is not in the buyer category, predicting whether the user will change to the buyer category within a defined time period;
   when the user is in the buyer category or predicted to be in the buyer category within the defined time period, determining a property recommendation using the user category, the at least one attribute of the at least one group and the features identified in the images of the properties; and
   providing the property recommendation to the user.

2. The method of claim 1, wherein the at least one group includes a location group, a do-it-yourself ("DIY") group, a style group, a spend group, a space group, a commute group, a privacy group, and a showcase group.

3. The method of claim 2, wherein each of the groups includes at least two attributes.

4. The method of claim 2, wherein:
   the location group includes attributes of at least urban, suburban, exurban, and rural,
   the DIY group includes attributes indicative as to how much a user prefers performing property repairs and renovations,
   the style group includes attributes of at least modern, classic, and mid-century,
   the spend group includes attributes of at least thrifty and spender,
   the space group includes attributes of at least micro, small, average, large, and estate,
   the commute group includes attributes of at least walking, public transit, and car,
   the privacy group includes attributes of at least private and open, and the showcase group includes attributes of at least modest and extravagant.

5. The method of claim 1, wherein the at least two different input variables include a property collection/favorites input variable, a rated/toured properties input variable, a neighborhood characteristics input variable, a hobbies, activities, interest, foods input variable, a purchase preferences input variable, a property parameters input variable, a property maintenance input variable, and a demographics input variable.

6. The method of claim 1, further comprising storing the user characteristic information and the property profile information in a memory device in association with an identifier of the user.

7. The method of claim 1, wherein the user characteristic information includes property transaction information and property-related web browsing information.

8. The method of claim 1, wherein the property profile information includes a feature list of at least one of available properties or properties viewed by the user.

9. The method of claim 1, wherein the neighborhood characteristic information includes at least one of quantitative data or qualitative data about neighborhoods.

10. The method of claim 1, and further comprising using the machine learning algorithm to use the classified input variables to determine a likelihood that the user will change to another user category within a certain time period.

11. The method of claim 10, and further comprising using the machine learning algorithm to determine the property recommendation using the user category or the other user category in addition to the at least one attribute of the group.

12. The method of claim 1, and further comprising using the machine learning algorithm to determine that a property recommendation is not needed for the user based on the user category.

13. The method of claim 1, and further comprising using the machine learning algorithm is further configured to:
determine a renovation or repair recommendation using the user category and at least one attribute of a group when the property recommendation is not needed; and
cause a processor to transmit the renovation or repair recommendation for display at a user device.

14. The method of claim 1, and further comprising using the machine learning algorithm to cause a processor to transmit the property recommendation for display at a user device.

15. The method of claim 1, wherein the property recommendation includes for each recommended property at least one of an identifier of the property, a link to an online or virtual real estate listing for the property, or one or more pictures of the property.

16. The method of claim 1, wherein the property recommendation includes a virtual pamphlet or magazine that provides at least one of pictures, video, property descriptions, and/or interactive elements in a sequential manner that is ordered based on a degree of a match with the at least one attribute of the group.

17. The method of claim 1, and further comprising training the machine learning algorithm using a training data set of known classifications, variable inputs, and property profiles.

18. The method of claim 1, and further comprising using the machine learning algorithm to:
receive new user characteristic information for the user;
newly classify the new user characteristic information into at least two different input variables;
use the newly classified input variables to determine at least one new attribute of at least one group; and
determine a new property recommendation using at least the user category and the at least one new attribute of the at least one group.

* * * * *